United States Patent
Butler

(10) Patent No.: US 7,293,983 B2
(45) Date of Patent: Nov. 13, 2007

(54) HEATING HYDROCARBON PROCESS FLOW USING FLAMELESS OXIDATION BURNERS

(75) Inventor: James R. Butler, Friendswood, TX (US)

(73) Assignee: Fina Technology, Inc., Houston, TX (US)

( * ) Notice: Subject to any disclaimer, the term of this patent is extended or adjusted under 35 U.S.C. 154(b) by 133 days.

(21) Appl. No.: 11/069,354

(22) Filed: Mar. 1, 2005

(65) Prior Publication Data
US 2006/0199127 A1  Sep. 7, 2006

(51) Int. Cl.
*F23D 11/44* (2006.01)
(52) U.S. Cl. ............... 431/215; 126/91 A; 432/179
(58) Field of Classification Search .............. 431/9, 431/215; 126/91 A
See application file for complete search history.

(56) References Cited

U.S. PATENT DOCUMENTS

| | | | |
|---|---|---|---|
| 4,298,333 A * | 11/1981 | Wunning | 431/11 |
| 4,705,022 A * | 11/1987 | Collier | 126/91 A |
| 6,007,326 A * | 12/1999 | Ryan et al. | 431/9 |
| 6,321,743 B1 * | 11/2001 | Khinkis et al. | 126/91 A |
| 6,588,416 B2 * | 7/2003 | Landais et al. | 126/91 A |
| 7,025,940 B2 * | 4/2006 | Shah et al. | 422/198 |

OTHER PUBLICATIONS

A. Quinqueneau, "Flameless Oxidation' Applied to High Temperature Process, Overview of Gaz de France R&D Activities on the Subject," Natural Gas Technologies Conference and Exhibition, Sep. 30, 2002, Orlando, Florida.

* cited by examiner

*Primary Examiner*—Steve McAllister
*Assistant Examiner*—Chuka C Ndubizu
(74) *Attorney, Agent, or Firm*—Shirley A. Kopecky

(57) ABSTRACT

Hydrocarbon streams are heated uniformly and directly using one or more flameless oxidation burners. Flameless oxidation burners may control the temperature within a range of about 50° C. to reduce the tendency to coking due to localized "hot spots". The hydrocarbon streams, which may be monomer streams, may pass cross-current (perpendicular) to burners having a longitudinal design or configuration, or may pass parallel to such burners.

30 Claims, 3 Drawing Sheets

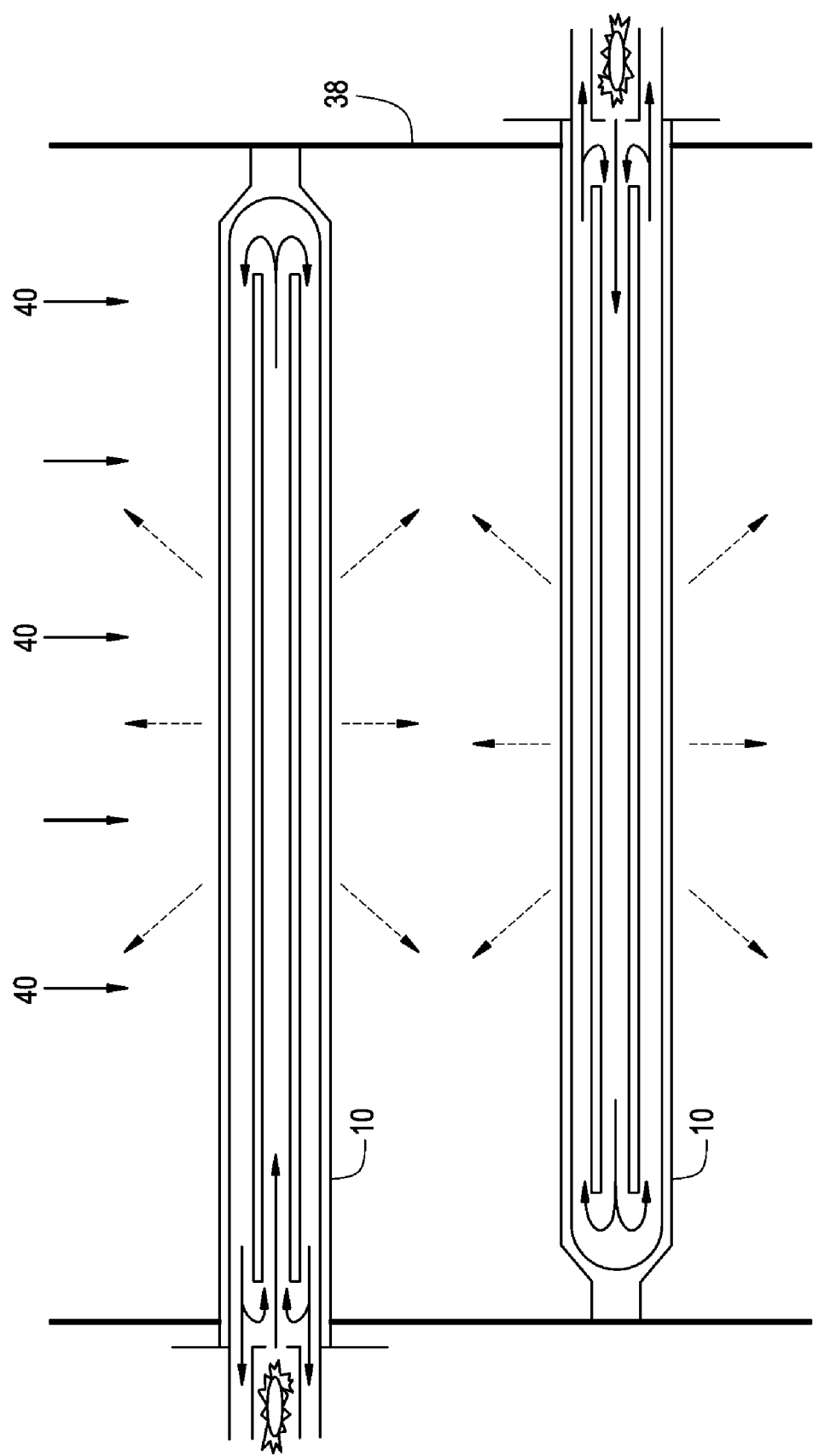

US 7,293,983 B2

HEATING HYDROCARBON PROCESS FLOW USING FLAMELESS OXIDATION BURNERS

FIELD OF THE INVENTION

The present invention relates to a process for heating hydrocarbons, and relates more particularly in one non-limiting embodiment to heating hydrocarbons, such as monomers, more uniformly with reduced incidence of hot spots.

BACKGROUND OF THE INVENTION

Conventional industrial furnaces (steel industry, metallurgy, ceramic, glass, forging and the like) use large quantities of natural gas. In order to save energy, most furnaces include an energy recuperation system on the exhaust gases to preheat the combustion air to temperatures up to about 1000° C. (in the case of regenerative burners). Enriching combustion air with oxygen also leads to not only a reduction of the volume of combustion products, but also to energy savings. Unfortunately, this is generally achieved with an increase in NOx emissions due to a higher flame temperature, and sometimes hot spots will occur in the furnaces, which can be harmful to the load being heated. Conventional regenerative burners have the same pros and cons as the oxygen-enriching air technique.

Heating hydrocarbons for processing, such as in endothermic reactions, is accomplished in a number of ways, including, but not limited to, direct heating and indirect heating, such as through the use of superheated steam. A continuing challenge is to heat a hydrocarbon, such as a continuous hydrocarbon process feed stream, uniformly so that undesirable "hot spots" of temperatures higher than specified do not occur in the heating unit. Such hot spots cause difficulties, such as coking or degradation or unwanted polymerization of a reactant or product.

These challenges are particularly present in the heating to make monomer streams, such as styrene streams, where hot spots undesirably cause coking. It would be particularly desirable if monomer streams could be directly heated to avoid the complexities of using indirect heating such as through superheated steam and the like. Furthermore, there are limits to the maximum temperature of superheated steam. If hydrocarbon or monomer heating is no longer dependent upon the amount of steam needed to heat or reheat the process streams to and/or from reactors, more energy saving devices may be installed to lower the energy required to process the hydrocarbons or monomers.

In more detail, conventionally, the energy needed for the reaction to convert ethylbenzene to styrene is supplied by superheated steam (at about 720° C.) that is injected into a vertically mounted fixed bed catalytic reactor with vaporized ethylbenzene. The catalyst is typically iron oxide-based and contains a potassium compound (KOH or $K_2CO_3$) which act as reaction promoters. Typically, 1-2 kg steam is required for each kilogram of ethylbenzene to ensure sufficiently high temperatures throughout the reactor. The superheated steam supplies the necessary reaction temperature of about 550-620° C. throughout the reactor. Ethylbenzene conversion is typically 60-65%. Styrene selectivity is greater than 90%. The system is generally operated under vacuum.

After the reaction, the products are cooled rapidly (perhaps even quenched) to prevent polymerization. The product stream (containing styrene, toluene, benzene, and unreacted ethylbenzene) is fractionally condensed after the hydrogen is flashed from the stream. The hydrogen from the reaction is typically used as fuel to heat the steam (boiler fuel).

It is a continuing goal of the industry to heat hydrocarbon streams, especially monomer streams, uniformly and within relatively strict temperature limits to achieve the necessary temperatures, but also to avoid localized hot spots and consequential degradation of the hydrocarbon, such as to coking products.

SUMMARY OF THE INVENTION

There is provided, in one form, a process for heating a hydrocarbon stream that involves placing within the hydrocarbon stream at least one flameless oxidation burner and directly heating the hydrocarbon.

In another embodiment herein, there is provided a hydrocarbon heating unit that includes a hydrocarbon stream, and at least one flameless oxidation burner within the hydrocarbon stream to directly heat the hydrocarbon.

In an additional non-limiting embodiment, the surface of the flameless oxidation burner is controlled within a range of about 50° C., and the incidence of hot spots is reduced compared with a conventional combustion burner.

BRIEF DESCRIPTION OF THE DRAWINGS

FIG. 3 is a schematic, cross-sectional illustration of using the flameless oxidation burner of the type from FIG. 1 perpendicular to a hydrocarbon stream.

DETAILED DESCRIPTION OF THE INVENTION

Figure 1:
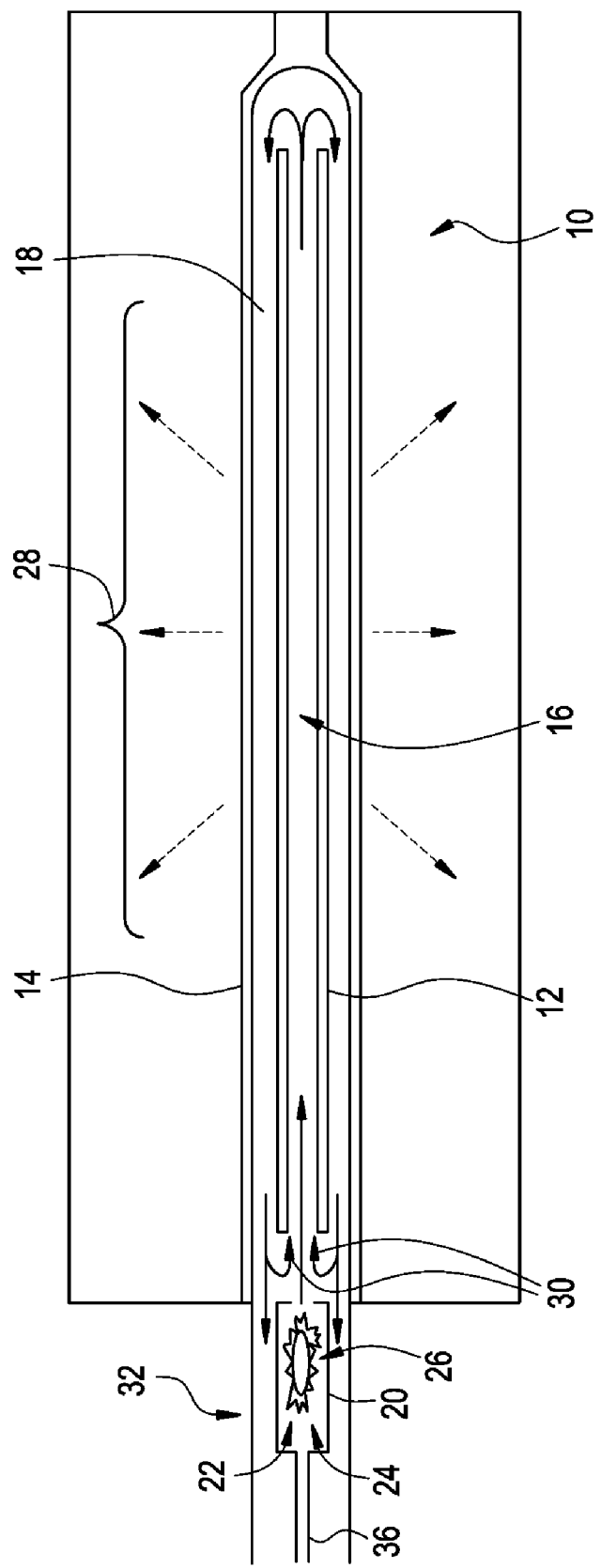
FIG. 1 is a schematic, cross-sectional illustration of one non-limiting embodiment of a "glove finger"-type flameless oxidation burner suitable for use in the method herein.

It has been discovered that flameless oxidation burners provide direct and uniform heating of hydrocarbons, such as monomers, with important advantages. The use of such burners removes dependence on superheated steam as an indirect method of heating, along with its attendant complexities and inefficiencies. This feature allows energy saving devices to be installed to lower the energy required to heat the hydrocarbon stream, as well as recover or recoup exhaust or waste heat.

In processes such as styrene production that are operated under vacuum, lower pressure drops are possible since the burners permit more cross-sectional area in the heating device or unit for the process fluids to flow through.

New combustion systems using very low levels of oxygen and very high preheated temperatures of the oxidant were developed to avoid the increase of NOx emissions due to the use of pre-treated air. Such systems are generally termed "flameless oxidation".

Flameless oxidation is combustion mode where techniques of reducing NOx emissions, such as by staging combustion and internal recirculation within a furnace, are pushed to extremes. Injecting fuel and oxidant at high velocity induces strong internal recirculation of combustion or exhaust products, and therefore an important dilution of the combustion air appears The local volumetric concentration of oxygen may reach values between about 3 and 15%. The high temperature of the combustion air (e.g., greater than 1000° C.) preheated by the regenerative system enables initiation and sustaining of this operating mode. Consequently, there is no longer a structured flame front, because the entire volume of the furnace or burner participates in the heat production.

The temperature profile generated by this type of oxidation is more flat or uniform than that achieved by conventional combustion involving flame. NOx emissions, mainly influenced by local flame temperature, may be greatly reduced, while temperature uniformity in the furnace or heating unit is strongly improved. Because of the diminution of flame temperature peaks, the average temperature level in the heating unit or furnace zone may be raised, without it leading to a local overheating or "hot spots" around the burners. The heat transfer to the load or hydrocarbon stream can therefore be considerably increased. Additionally, combustion noise is reduced.

From a phenomenological point of view, high temperature air preheated by combustion products (e.g., greater than 1000° C.) is supplied to the burner. In conventional systems, such preheating would definitely lead to high local flame temperatures and therefore to high NOx emissions levels. By contrast, in flameless oxidation systems, combustion air and fuel injections are separately realized using high velocities. Burner and combustion chamber geometry, associated with the high velocities of the flows, create combustion products recirculating toward the burner. The flame may hardly be seen, and it has been shown that combustion is now distributed in the entire burner volume. The relatively consistent temperature and composition uniformity of the combustion chamber is a remarkable characteristic of this process.

Shown in FIG. 1 is a schematic, cross-sectional illustration of one non-restrictive embodiment of a flameless oxidation burner 10 that may be used in the process herein. This particular design is of the "glove finger" type, which involves at least two concentric tubes, recirculation tube 12 within outer burner wall 14 with flameless oxidation occurring within inner chamber 16, and the exhaust or oxidation products recirculating back toward the burner nozzle 20 through the outer chamber 18 where flameless oxidation may also occur. Air 22 and fuel 24 (e.g. natural gas) are injected into central injection tube 36 at high velocity ignited at point 26 within nozzle 20. Convective and radiative heat exchange occurs in outer chamber 18 through outer burner wall 14, where radiative heat exchange toward the furnace or heating unit is represented by arrows 28. Exhaust or combustion gases 34 are recirculated in recirculation zone 30 back into inner combustion chamber 16. Combustion products or exhaust gases 34 leave at exit 32, and may be used to preheat air 22 and fuel 24. Indeed, the incoming air 22 is typically preheated with the exhaust gas from exit 32.

The outer wall 14 temperature may be controlled within 30° C. at temperatures as low as about 815° C. Alternatively, the temperature may be controlled within 40° C., and in another non-limiting embodiment within the range of 50° C. In this design, the exhaust gas is recirculated at a high rate to control the level of oxygen to below about 3%. Thus, the oxidation and heat release is kinetically controlled and has no flame.

In one non-limiting embodiment, the burner 10 is described as a burner of the "glove finger" type and includes an exchanger for heating air 32 by exhaust gases 34, an outer burner wall 14 and a central gas-injection tube terminated by a nozzle 20 disposed facing a recirculation tube 12. Generally, the temperature range of the flameless oxidation burners is between about 750° C. and about 1400° C. in one non-limiting embodiment, and may be between about 770° C. and about 1200° C. in an alternate, non-restrictive embodiment.

In another non-restrictive embodiment, the burner is a radiant device of the type described in U.S. Pat. No. 6,588, 416 B2, incorporated by reference in its entirety herein. The radiant devices or burners of this patent have been used to date in metal and glass factories but not to heat or reheat hydrocarbon process streams such as monomers, e.g. styrene. Monomers other than styrene could, of course, be heated or reheated with the burners herein, such as ethylene and propylene. Indeed, any process needing heat input could benefit from this design. Apparatus that could benefit from using flameless oxidation burners include, but are not necessarily limited to, reformers for aromatics, process heaters in refineries, steam crackers etc.

This patent describes a radiant device with a gas burner and recirculation of burned gases for heating a vessel bounded by a wall. The device may include in longitudinal axial direction a section external to the vessel and a section both internal to the vessel and divided into three internal subsections disposed successively at increasing distance from the wall and, in inward radial direction, an envelope comprising an external casing and an internal envelope tube, the end of which is remote from the wall is closed. The device may also include an exchanger disposed in the envelope and extending over a portion of the external section and over the first two internal sections, a recirculation tube extending over the third internal section at a radial distance from the envelope tube and having open inlet and outlet ends respectively relatively close to and relatively far from the wall of the vessel. The device of this patent may also include a retaining tube internal to the exchanger and extending over a portion of the external section and over the first internal section, and a furnace tube disposed in the exchanger, retained by the retaining tube in the extension thereof and extending over the second internal section. The device may also include a central injection tube for transporting the gas, extending at least into the retaining tube and traversing a partition separating the retaining tube from the furnace tube. The exchanger may include a separating tube that defines with the retaining tube and the furnace tube an air intake path starting in an intake inlet in the casing and ending at intake orifices in the furnace tube, where the separating tube defines with the envelope a smoke-exhaust path ending at an exhaust outlet in the casing, and the furnace tube ending in a nozzle disposed facing the inlet end of the recirculation tube.

Burners of the type in U.S. Pat. No. 6,588,416 have been used with a 2-meter long outer burner wall tube 14 in heating non-hydrocarbon process streams. For use in heating or reheating styrene monomer, in one non-limiting embodiment, the burner 10 could be up to 15 meters long. The burner length may vary depending upon the particular hydrocarbon or monomer being heated.

Figure 2:
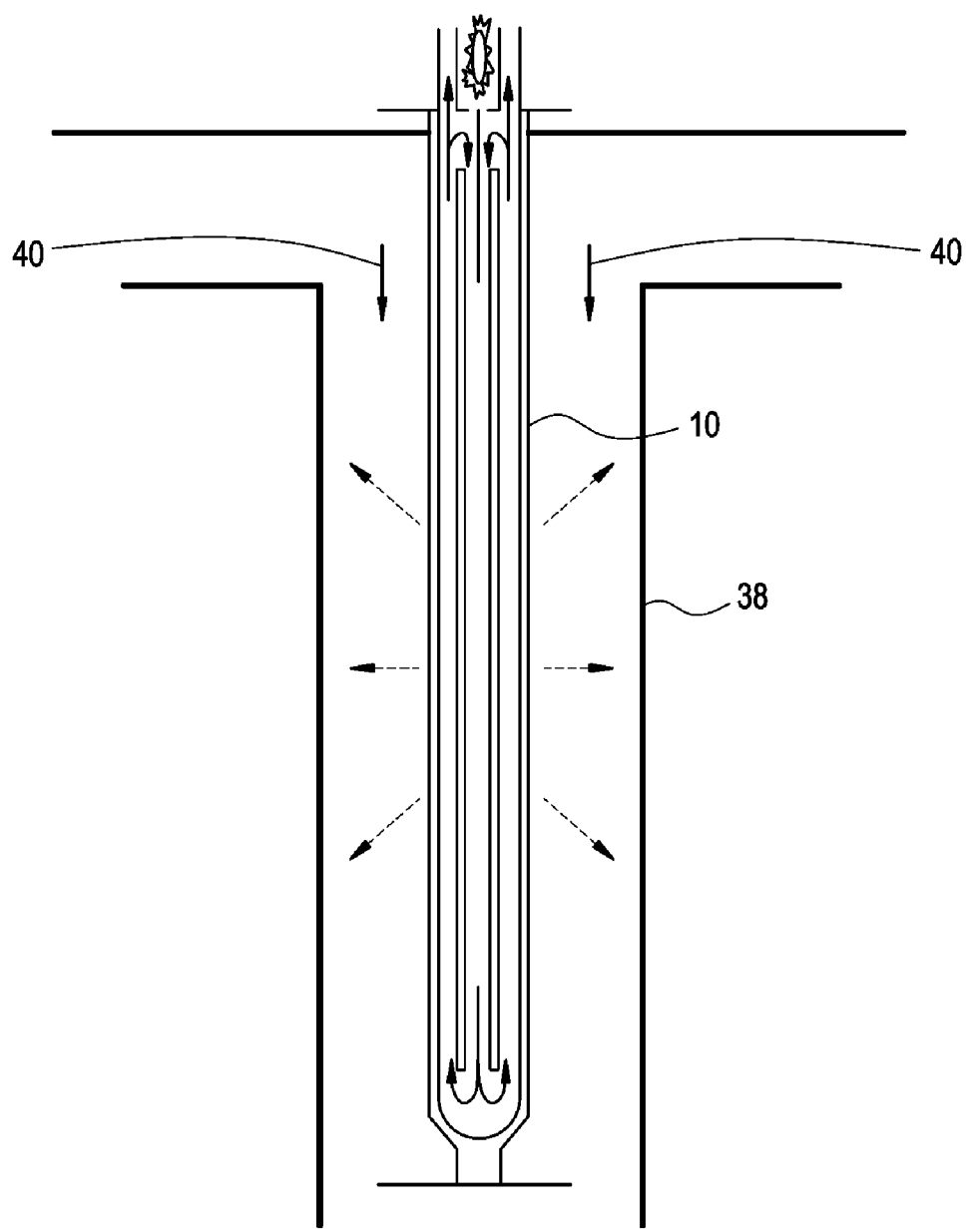
FIG. 2 is a schematic, cross-sectional illustration of using the flameless oxidation burner of the type from FIG. 1 parallel to a hydrocarbon stream for heating thereof.

In one non-restrictive version, the hydrocarbon, monomer or other process flow or stream 40 is parallel to the longitudinal configuration and central axis of the burner 10, as shown in FIG. 2. In a different non-limiting version, the hydrocarbon, monomer or other process flow or stream 40 is perpendicular to the longitudinal configuration and central axis of the burner 10, as shown in FIG. 3.

It is expected that in an actual implementation of this method that on a commercial scale multiple burners would be used in a furnace, stream or flow line, such as shown in FIG. 3, although multiple burners 10 are expected in the parallel configurations shown in FIG. 2 as well. Many designs and configurations could be devised having multiple burners 10 stabbed to a vessel or conduit 38 to heat or reheat the process stream 40. As noted, the cross flow design of FIG. 3 is very simple and could have the design and pressure drop advantages previously discussed. For a styrene reheater, the number of burners that could be used may be about 200, in one non-limiting embodiment.

The method herein would of course find applicability for endothermic reactions, and a heater or reheater may be used before each reactor, such as in the conversion of ethylbenzene to styrene, in one non-restrictive version. When heat is added between two reactors, this is referred to as reheating the process stream, and the device is called a reheater. In the non-limiting case of styrene, the target temperature would be in the range of about 650° C. to about 955° C. (about 1200 to about 1750° F.). That is, about 955° C. would be about the maximum outer skin temperature of the outer burner wall-14. One would not operate a reheater below about 650° C. for styrene.

In operation, the burners 10 start as normal burners until the desired temperature is reached, at which time it switches to flameless oxidation mode. That is, one would ramp up to near process temperature to be sure the unit was hot enough to support flameless combustion. Thus, the start-up issues are similar to a normal or conventional furnace, and a start-up fuel or minimum temperature is not required to start up the heating unit or conduit.

It is expected that the advantages of using the flameless oxidation burners would include avoiding the use of superheated steam and the complexities of using an indirect heating method. This would permit more direct energy saving devices to be installed to lower the total energy requirements to make styrene or some other product.

In vacuum operations such as the production of styrene, more cross-sectional area in the heating device or unit could be permitted to give a lower pressure drop and further savings.

In the foregoing specification, the apparatus and methods for heating and reheating hydrocarbons and process streams thereof have been described with reference to specific embodiments, and has been taught as effective in heating hydrocarbons, such as monomers. However, it will be evident that various modifications and changes may be made to the methods and structures herein without departing from the broader spirit or scope of the invention as set forth in the appended claims. Accordingly, the specification is to be regarded in an illustrative rather than a restrictive sense. For example, specific burner configurations, hydrocarbon streams, and other differences from those explicitly taught falling within the claimed parameters, but not specifically identified or tried in a particular method or apparatus, are anticipated and expected to be within the scope of this invention. In particular, the process of heating a hydrocarbon may be conducted under conditions (temperature, pressure, feed rates, etc.) other than those discussed or exemplified herein.

What is claimed is:

1. A process for heating a hydrocarbon stream, comprising:
   providing a vessel;
   placing at least one flameless oxidation burner within the vessel;
   providing fuel and air for the oxidation burner;
   introducing a hydrocarbon stream into the vessel and heating the hydrocarbon stream with said burner;
   wherein an exhaust or an oxidation product is produced by heating said hydrocarbon stream, and wherein the exhaust or the oxidation product is internally recirculated within the burner to dilute the fuel and incoming air so that a volumetric concentration of oxygen within the burner is below about 3%; and
   where a temperature variability of a surface of the flameless oxidation burner is controlled within a range of from 30° C. to 50° C.

2. The process of claim 1 where the flameless oxidation burner has a longitudinal configuration with a central axis and the hydrocarbon stream flows parallel thereto.

3. The process of claim 1 where the flameless oxidation burner has a longitudinal configuration with a central axis and the hydrocarbon stream flows perpendicular thereto.

4. The process of claim 1 where the hydrocarbon stream comprises a monomer.

5. The process of claim 4 where the monomer is selected from the group consisting of styrene, ethylene, propylene, and combinations thereof.

6. The process of claim 1 where the burner is of the longitudinal, "glove finger" type and comprises an exchanger for heating air by exhaust gases, an outer burner wall and a central gas-injection tube terminated by a nozzle disposed facing a recirculation tube.

7. The process of claim 1 where a temperature of an outer wall of the flameless oxidation burner is between about 650° C. and about 955° C.

8. A process for heating a hydrocarbon stream, comprising:
   providing a vessel;
   placing at least one flameless oxidation burner within the vessel;
   providing fuel and air for the oxidation burner;
   introducing a hydrocarbon stream into the vessel and heating the hydrocarbon stream with said burner;
   wherein an exhaust or an oxidation product is produced by heating said hydrocarbon stream and wherein the exhaust or the oxidation product is internally recirculated within the burner to dilute the fuel and incoming air so that a volumetric concentration of oxygen within the burner is between about 3% and 15%; and
   where a surface of the flameless oxidation burner is controlled within a range of front 30° C. to 50° C., and where the incidence of coking from hot spots in the hydrocarbon stream is reduced compared with conventional combustion burners.

9. The process of claim 8 where a temperature of an outer wall of the flameless oxidation burner is between about 650° C. and about 955° C.

10. A hydrocarbon heating unit comprising:
    a vessel and a hydrocarbon stream, and at least one flameless oxidation burner within the vessel;
    fuel and air for the oxidation burner;
    wherein the hydrocarbon stream is introduced into the vessel, and wherein the oxidation burner heats the hydrocarbon stream;
    wherein an exhaust or an oxidation product is produced by heating said hydrocarbon stream, and wherein die exhaust or the oxidation product is internally recirculated within the burner to dilute the fuel and incoming air so that a volumetric concentration of oxygen within the burner is between about 3% and 15%; and
    wherein a temperature variability of a surface of the flameless oxidation burner is controlled within a range of from 30° C. to 50° C.

11. The hydrocarbon heating unit of claim 10 wherein the flameless oxidation burner has a longitudinal configuration with a central axis and the hydrocarbon stream flows parallel thereto.

12. The hydrocarbon heating unit of claim 10 wherein the flameless oxidation burner has a longitudinal configuration with a central axis and the hydrocarbon stream flows perpendicular thereto.

13. The hydrocarbon heating unit of claim 10 wherein the incidence of coking from hot spots in the hydrocarbon stream is reduced as compared with using conventional combustion burners to heat the hydrocarbon stream.

14. The hydrocarbon heating unit of claim 10 wherein the burner is of the longitudinal, "glove finger" type and comprises an exchanger for heating air by exhaust gases, an outer burner wall and a central gas-injection tube terminated by a nozzle disposed facing a recirculation tube.

15. A hydrocarbon heating unit comprising:
a vessel and a hydrocarbon stream, and at least one flameless oxidation burner within the vessel;
fuel and air for the oxidation burner;
wherein the hydrocarbon steam is introduced into the vessel and wherein the oxidation burner heals the hydrocarbon stream;
wherein an exhaust or an oxidation product is produced by heating said hydrocarbon stream, and wherein the exhaust or the oxidation product is internally recirculated within the burner to dilute the fuel and incoming air so that a volumetric concentration of oxygen within the burner is below about 3%; and
wherein a temperature variability of a surface of the flameless oxidation burner is controlled within a range of from 30° C. to 50° C. and where the incidence of coking from hot spots in the hydrocarbon stream is reduced compared with conventional combustion burners.

16. The hydrocarbon heating unit of claim 15 wherein the burner is of the longitudinal, "glove finger" type and comprises an exchanger for heating air by exhaust gases, an outer burner wall and a central gas-injection tube terminated by a nozzle disposed facing a recirculation tube.

17. The process of claim 1 further comprising the step of using multiple burners to heat said hydrocarbon stream.

18. The process of claim 1 wherein air and fuel are injected into the burner through a central injection tube within a nozzle.

19. The process of claim 8 where the oxidation and the heat of the burner is kinetically controlled.

20. The process of claim 8 wherein during start up, the burner starts as flame type burner until a desired temperature is reached and then switches to a flameless oxidation mode.

21. The process of claim 8 where the "glove finger" type burner has at least two concentric tubes, a recirculation tube within an outer burner wall with flameless oxidation occurring within an inner chamber, with the exhaust or oxidation products recirculating back toward a burner nozzle though an outer chamber.

22. The process of claim 21 where flameless oxidation also occurs in the outer chamber.

23. The process of claim 21 where convective and radiative heat exchange occurs in the outer chamber through the outer burner wall and where exhaust or combustion gases are recirculated in a recirculation zone back into the inner combustion chamber.

24. The process of claim 23 where the combustion products or exhaust gases leave an exit and are used to preheat air and/or fuel.

25. The process of claim 8 further comprising the step of using multiple burners to heat said hydrocarbon stream.

26. The hydrocarbon heating unit of claim 10 wherein air and fuel are introduced into the burner through a central injection tube.

27. The hydrocarbon heating unit of claim 10 wherein the burner is up to 15 meters in length.

28. The hydrocarbon heating unit of claim 27 wherein the unit is used in processes for aromatics, a refinery, or a steam cracker.

29. The hydrocarbon heating unit of claim 10 wherein multiple burners are located within said unit.

30. The hydrocarbon heating unit of claim 15 wherein multiple burners are located within said unit.

* * * * *